Jan. 28, 1969         J. WEIGEL         3,424,663
PROCESS FOR ELECTROPHORETIC DEPOSITION
USING COMPLEXING AGENTS
Filed June 10, 1964
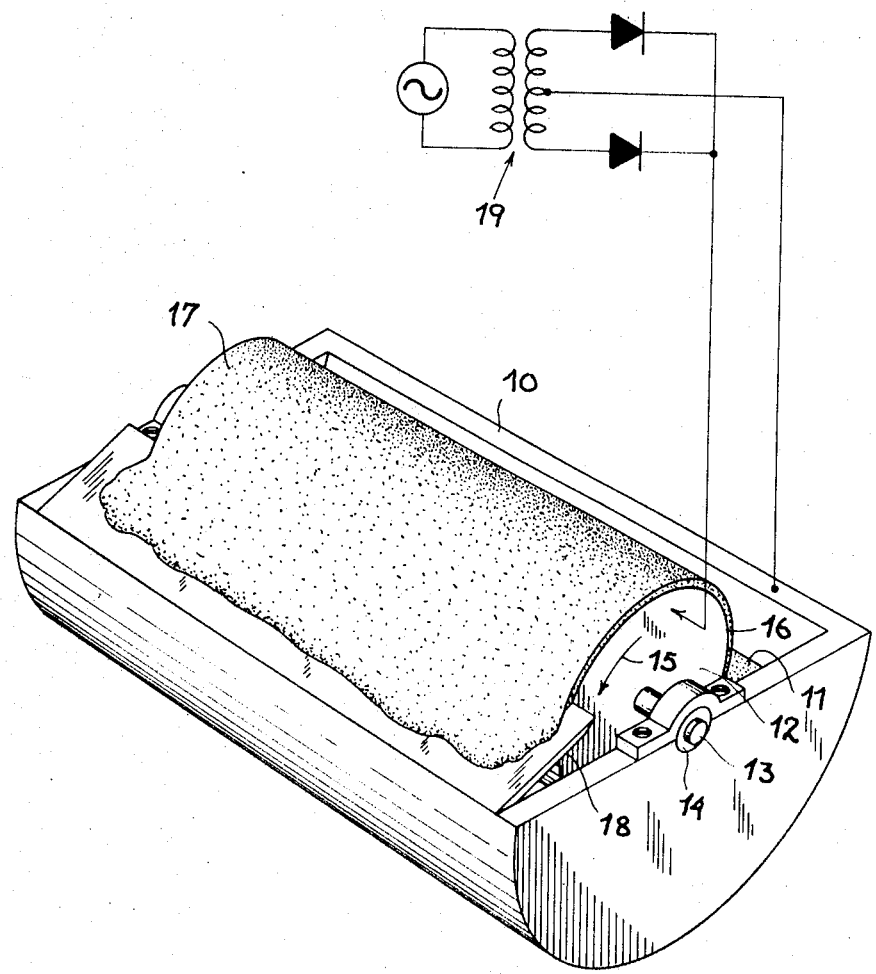
JÜRGEN WEIGEL
INVENTOR.
BY *Mestern, Ross & Mestern*

A

United States Patent Office 3,424,663
Patented Jan. 28, 1969

3,424,663
PROCESS FOR ELECTROPHORETIC DEPOSITION USING COMPLEXING AGENTS
Jürgen Weigel, Hamburg-Bergedorf, Germany, assignor to Hamburger Flugzeugbau G.m.b.H., Hamburg-Finkenwerder, Germany, a corporation of Germany
Filed June 10, 1964, Ser. No. 373,970
Claims priority, application Germany, June 15, 1963, H 49,471
U.S. Cl. 204—181    9 Claims
Int. Cl. C23b 13/00

ABSTRACT OF THE DISCLOSURE

To produce an adherent coating of synthetic resin on a metallic substrate, the resin is dispersed in an aqueous solution to form negatively polarized particles therein which are attracted toward a surface of an anodically connected metallic substrate; in order to prevent the interaction of these particles with metal ions released by the anode into the solution, these cations are converted into anions by a chemical reaction with a complexing agent having the necessary affinity for the metal involved.

My present invention relates to a process for recovering synthetic resins and other materials from dispersions by electrophoresis.

Processes for the electrophoretic precipitation of rubber particles from dispersions thereof onto metallic surfaces have been proposed heretofore. Such processes usually involve the suspension of the rubber particles in a liquid medium and the immersion of an electrode-forming substrate into this medium with the application of an electric current across the substrate and a counterelectrode to draw particles of rubber from this dispersion onto the substrate surface. Such electrophoretic precipitation of rubber has a significant disadvantage in that the rubber particles possess a low adhesion to the substrate; moreover, the layer formed upon the substrate is electrically insulating and limits the electrophoretic-deposition current so that the thickness of the layer is also restricted. For these reasons, therefore, there has been little actual use of electrophoretic techniques in the precipitation of synthetic resins. It may be further noted that such processes have not found actual application in the production of synthetic resins or bodies coated therewith because the ionic particles discharged into the medium from the substrate or the counterelectrode (generally the former) have an electrical charge of a polarity opposite that normally possessed by the synthetic-resin particles so that the latter are prematurely precipitated by combinations of the two groups of particles with consequent flocculation and do not necessarily deposit upon the substrate.

It is a principal object of the present invention, therefore, to provide a process for the electrophoretic deposition of particles, especially synthetic resins, whereby the aforedescribed disadvantages can be obviated.

A more specific object of this invention is to provide an improved process for depositing a highly adherent layer of synthetic resin from a dispersion of synthetic-resin particles upon a conductive substrate.

Still another object of this invention is to provide an improved method of recovering synthetic resins from dispersions thereof by electrophoresis without premature flocculation and precipitation.

Yet another object of this invention is the provision of an improved apparatus for carrying out the process described above.

These objects and others which will become apparent hereinafter are attained, in accordance with the present invention, by a process for the electrophoretic deposition of synthetic-resin particles upon a conductive substrate in the presence of ionic particles from this substrate or a counterelectrode, which involves the alteration (i.e. neutralization or, preferably, reversal) of the effective charge of one of these groups of particles so that there is no tendency for the ionic particles to combine with the synthetic-resin particles and produce premature deposition. It is an important aspect of the present invention that this alteration of the electric charge of one of the group of particles and preferably the ionic particles is effected by chemically tying up these particles with ions of opposite electrical charge, generally by complex formation. To this end, a complex former or complexing agent may be added to the preferably aqueous medium or can be formed in situ therein as described hereinbelow. It is thus possible to impart the identical polarities to the ionic particles and the synthetic-resin particles.

According to another feature of this invention, the synthetic-resin particles are solid particles of one or more high-molecular-weight polymers, e.g. formed by addition, substitution or condensation polymerization, the liquid medium further including conductive particles depositable on the substrate concurrently with the synthetic-resin particles so that the resin layer cannot function as an insulator modifying the electrophoretic current flow. In other words, these conductive particles maintain the electric current flow between the collecting surface of the substrate and the liquid medium or phase. It may be noted that these particles can be the ionic particles mentioned above whose effective electrical charge has been reversed in polarity by complex formation.

According to another feature of this invention, the substrate is composed of a metal which is anodized concurrently with deposition of the synthetic resin so that an oxide layer is formed on the collecting surface simultaneously with deposition of the synthetic resin. This arrangement is especially advantageous for aluminum substrates; the oxide layer functions in part as a complex former in that it ties up metal ions as noted earlier. Additionally, it is a more specific feature of this invention that the synthetic-resin dispersion includes particles of a coloring agent or pigment which are deposited as part of the resin layer. It may be noted that, when the substrate is rendered anodic as is usually the case (as a consequence of the generally negative charge carried by the resin particles), anionic dyestuffs may be employed. Cationic dyestuffs can be used when the substrate is at a negative charge.

Electrophoretic deposition can be carried out upon most conductive materials such as metals (e.g. iron, iron alloys, zinc, cadmium, nickel, copper and aluminum), graphite, metal oxides and the like. The electrophoretic deposition is carried out by juxtaposing the conductive substrate, constituting a first electrode, with a second or counterelectrode and applying, by means of an external circuit, an electric current together with the addition of complex formers, which can be organic or inorganic depending upon the particular requirements. The process is generally similar to that of electrolysis. The complex formers must be so chosen that they are capable of effecting direct deposition of the synthetic-resin particle upon the conductive substrate. This can be achieved, in general, by insuring that the complex formers can convert the metal ions, entering the solution from the substrate or counterelectrode and having a positive charge, into negatively charged particles, thereby preventing these metal ions from prematurely flocculating the negative macromolecules of synthetic resins; the synthetic-resin particles are carried to the conductive substrate without interference and adhere intimately and tenaciously thereto. As an alternative to this anodic deposition of the synthetic resin, it is possible to render the substrate cathodic and provide a dispersion of positive synthetic-resin macromolecules or else employ complex formers which reverse the polarity of the negative macromolecules.

When the substrate or counterelectrode is composed of aluminum or aluminum alloys, the complex former can be a fluoride such as ammonium fluoride; when copper or zinc constitute the substrate, cyanide complex formers (e.g. cadmium cyanide or potassium cyanide) can be employed. For iron and its alloys, EDTA complex formers (e.g. sodium-ethylenediaminetetra-acetic acetates) can be used. The cathodic or anodic deposition of the dispersed particles can be carried out either with pure direct current or with alternating current of higher or lower frequency; it has been found to be advantageous to use a pulsating direct current with a characteristic pulse frequency. The electrophoresis voltage can, according to this invention, range between 0.5 and 100 volts with a current density between 0.01 and 25 amps/dm.$^2$. It has been found that the higher current densities result in denser layers so that selection of the current density makes possible a control over the structure of the layer.

The layer forms with a generally cellular or porous structure so that, at the conclusion of the process, at least the surface of the layer is partly formed with open cells. To close these cells or to fill them, it is a feature of the present invention to subject the layer to a further deposition of synthetic resin or a heat treatment subsequent to the electrophoretic process. The aftertreatment can, therefore, be of the type generally referred to as Eloxing whereby the layer is immersed in a dispersion of synthetic-resin particles which deposit from the liquid medium onto the layer; this technique results in a partial or complete filling of the cellular structure. Alternatively or in addition, it is generally desirable to subject the layer to a heat treatment at a temperature above the softening point of the thermoplastic synthetic resin but not greater than about 200° C. The heat treatment can be provided before or after the last resin-deposition step. The color pigment can, if desired, also be added during the subsequent deposition.

The coating of objects with synthetic resin, according to the present invention, can be carried out for a variety of purposes. Thus it is frequently desirable that the synthetic-resin layer constitutes a corrosion-resistant, flexible and wear-resistant layer. The frictional resistance of the layers produced in accordance with the present invention can be several times greater than that of layers produced by electrolysis. In another use of such layers, the synthetic resin can be employed as a sealing means between interconnected parts. The layers are so tenacious that they are not destroyed even during connection of the parts by rivets, bolts or the like and, when the connecting means is also provided with such coatings, the contacting surfaces of the synthetic-resin layers can be welded together (e.g. heat-sealed) so that a substantially monolithic protective covering is provided. The layers can also serve as bases for adhesives which might otherwise not bond securely to the substrate, the intervention of the synthetic-resin layer markedly improving the shear strength of any adhesive connection formed. Moreover, the present technique can be used for depositing synthetic resin upon wires or cables to serve as insulating sheaths. When this technique is compared with earlier dip-coating and multiple dryings, it is clear that a substantial increase in the rate of production, effectiveness of bonding and simplicity of handling is involved.

The invention will be described in greater detail hereinafter with reference to the following examples and the accompanying drawing, the sole figure of which is a perspective view of an apparatus for recovering synthetic resins according to this invention.

In the drawing, I show a receptacle or tank 10 containing a bath 11 constituted by an aqueous dispersion of synthetic-resin particles. A drum 12 has its shaft 13 journaled in insulated bearings 14 relative to the tank 10; the surface 16 of the conductive drum 12 receives a deposit 17 of synthetic resin which is stripped from the surface by a blade 18 upon rotation of the drum in the direction of arrow 15 by suitable drive means not shown. The resinous layer is carried by the blade 18 to a receptacle. A source of pulsating direct current 19 has its positive terminal connected to the drum 12 while its negative terminal is connected to the tank 10 constituting the counterelectrode.

EXAMPLE I

An aqueous dispersion of a high-molecular-weight polyacrylate (10–30% solid synthetic-resin particles) has dissolved therein 1.5% by weight ammonium fluoride as a complex former. The substrate and counterelectrode are composed of aluminum and a potential of 10 volts with a current density of 1 amp/dm.$^2$ is applied. The substrate is rendered anodic while the counterelectrode is cathodic; pulsating direct current is employed. With a bath temperature of 15–35° C., a layer of polyacrylate is formed whose density increases with increasing current density and whose thickness is merely a function of the duration of the electrophoresis process. The process is carried out for a period sufficient to deposit in excess of 50% of the polyacrylate particles upon the metal substrate. The adhesion of the polyacrylate is found to be vastly superior to that obtained by other methods of coating the substrate.

EXAMPLE II

1% by weight potassium cyanide is added to a 10–40%, by weight, dispersion of polymerized vinylidene chloride in water. Substrates and counterelectrodes consisting of copper and zinc are employed at a temperature of 15–35° C.; deposition of almost all of the synthetic-resin particles is obtained with a potential of 8 volts and a current density of 0.8 amp/dm.$^2$.

The following types of synthetic resins were found to be suitable for the purposes described above; polyacrylates, polyvinylidene chlorides, polyvinyl chlorides, polyvinylethers, polyisobutylenes, polyvinylpropionates, polystyrenes, polyvinylacetates, polyvinylalcohols and polyvinylpyridines.

By proper selection of the synthetic resins, a wide range of physical characteristics of the synthetic-resin layer can be obtatined. For instance, with the examples given above it was possible to obtain specific gravities of the layers between substantially 0.8 and 1.12, appearances ranging from transparent through white and brown, and layer characteristics ranging from tacky or adhesive through nontacky, heat-sealable and weldable. The layers were temperature-resistant in the range of −70° to +250° C., and had a resistance to deterioration by light ranging from good to poor, a tear resistance ranging from 6 to 1200 kp./cm.$^2$ and a tear-yield point from 3 to 3800% in excess of conventional coatings.

The invention described and illustrated is believed to admit of many modifications within the ability of persons skilled in the art, all such modifications being considered within the spirit and scope of any invention except as otherwise limited by the appended claims.

I claim:
1. A process for depositing a synthetic resin upon a metallic substrate anodically soluble in aqueous solution, comprising the steps of:
   forming a dispersion of particles of said synthetic resin in an aqueous medium with acquisition of a negative polarity by said particles;
   immersing in said medium an electrode constituted by said metallic substrate and a counterelectrode;
   applying to said substrate a positive potential with reference to said counterelectrode whereby metal ions from a surface of said substrate go into solution in said medium and particles of said resin are attracted toward said surface;

preventing precipitation of said particles upon interaction with said metal ions by reversing the polarity of said metal ions in said solution through chemical reaction with a complexing agent capable of forming negatively charged complex ions with said metal ions; and electrophoretically depositing said particles on said surface in the presence of said negatively charged complex ions.

2. A process as defined in claim 1 wherein said particles are taken from a high-molecular-weight polymer.

3. A process as defined in claim 2 wherein said polymer is selected from the group consisting of polyacrylates, polyvinylidene chloride, polyvinyl chloride, polyvinylesters, polyisobutylenes, polyvinylpropionates, polyvinylacetate, polyvinylalcohol and polyvinylpyridine.

4. A process as defined in claim 1, comprising the further step of dispersing a colorant in said medium for deposition on said surface together with said particles.

5. A process as defined in claim 1 wherein said positive potential ranges between substantially 0.5 and 100 volts at a current density between substantially 0.01 and 25 amp/dm.$^2$.

6. A process as defined in claim 1, comprising the further step of densifying the deposited particles on said surface into a resinous layer by heating said particles to a temperature above the softening point of the resin.

7. A process as defined in claim 1 wherein said complexing agent is a fluoride.

8. A process as defined in claim 1 wherein said complexing agent is a cyanide.

9. A process as defined in claim 1 wherein said complexing agent is an EDTA compound.

References Cited

UNITED STATES PATENTS

| 3,200,057 | 8/1965 | Burnside et al. | 204—181 |
| 3,230,162 | 1/1966 | Gilchrist | 204—181 |

OTHER REFERENCES

Fink et al.: "Electrodeposition and Electrochemistry of the Deposition of Synthetic Resins," Transactions of the Electrochemical Society, vol. 94, 1948, pp. 309–310, 315–318, 321–325, 336–339.

Narcus: "The Role of Chelating Agents in the Plating Industry," Metal Finishing, vol. 50, No. 3, 1952, pp. 54–62.

JOHN H. MACK, *Primary Examiner.*

E. ZAGARELLA, *Assistant Examiner.*